United States Patent
Shao et al.

(10) Patent No.: US 8,867,341 B2
(45) Date of Patent: *Oct. 21, 2014

(54) TRAFFIC MANAGEMENT OF CLIENT TRAFFIC AT INGRESS LOCATION OF A DATA CENTER

(75) Inventors: Bill Shao, Pleasanton, CA (US); Cynthia Ann Gabriel, Gilroy, CA (US); Tienwei Chao, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 979 days.

This patent is subject to a terminal disclaimer.

(21) Appl. No.: 12/900,579

(22) Filed: Oct. 8, 2010

(65) Prior Publication Data

US 2011/0026403 A1 Feb. 3, 2011

Related U.S. Application Data

(63) Continuation-in-part of application No. 12/741,225, filed as application No. PCT/US2008/082707 on Nov. 7, 2008.

(60) Provisional application No. 60/986,842, filed on Nov. 9, 2007, provisional application No. 61/018,047, filed on Dec. 31, 2007.

(51) Int. Cl.
*H04L 12/26* (2006.01)
*H04L 29/08* (2006.01)

(52) U.S. Cl.
CPC ........ *H04L 67/2895* (2013.01); *H04L 67/1023* (2013.01); *H04L 67/1002* (2013.01)
USPC ........................................ 370/229; 370/230.1

(58) Field of Classification Search
None
See application file for complete search history.

(56) References Cited

U.S. PATENT DOCUMENTS

| 6,377,998 | B2 | 4/2002 | Noll et al. |
| 6,553,030 | B2 | 4/2003 | Ku et al. |
| 6,697,368 | B2 | 2/2004 | Chang et al. |
| 6,735,198 | B1 | 5/2004 | Edsall et al. |
| 7,194,550 | B1 | 3/2007 | Chamdani et al. |
| 7,240,364 | B1 * | 7/2007 | Branscomb et al. ............. 726/9 |

(Continued)

OTHER PUBLICATIONS

Final Office Action in related U.S. Appl. No. 12/741,225, mailed on Oct. 29, 2012; 14 pages.

(Continued)

*Primary Examiner* — Rhonda Murphy
(74) *Attorney, Agent, or Firm* — Schmeiser, Olsen & Watts LLP

(57) ABSTRACT

A switch device includes a packet-forwarding table for providing traffic management across servers in a server group. Each table entry maps a hash value to a server in the server group. A hash value is computed from data in one or more fields in the header of a received packet. The computed hash value is used as an index into the packet-forwarding table to access a table entry and to identify from the table entry the server in the server group to which the table entry maps the computed hash value. The switch device forwards the packet to the identified server. Implementing traffic management decisions in hardware enables packet switching at the line rate of the switch ports. In addition, the hardware-based traffic management performed by the switch device eliminates session tables and the memory to store them, enabling the switch device to handle an unlimited number of client connections.

34 Claims, 12 Drawing Sheets

(56) References Cited

U.S. PATENT DOCUMENTS

| | | |
|---|---|---|
| 7,266,598 B2 | 9/2007 | Rolia et al. |
| 7,821,925 B2 | 10/2010 | Davies |
| 7,953,074 B2* | 5/2011 | Pettey et al. .................. 370/362 |
| 7,978,690 B2 | 7/2011 | Abel et al. |
| 8,160,082 B2 | 4/2012 | Harris et al. |
| 2003/0074467 A1 | 4/2003 | Oblak et al. |
| 2004/0098499 A1* | 5/2004 | Tamai ........................... 709/232 |
| 2005/0111455 A1 | 5/2005 | Nozue et al. |
| 2005/0182815 A1 | 8/2005 | Offredo et al. |
| 2006/0080446 A1 | 4/2006 | Bahl |
| 2006/0095960 A1 | 5/2006 | Arregoces et al. |
| 2007/0180113 A1 | 8/2007 | Van Bemmel |
| 2008/0163372 A1 | 7/2008 | Wang |
| 2008/0177896 A1 | 7/2008 | Quinn et al. |

OTHER PUBLICATIONS

FULCRUM Microsystems, Load Distribution in Telecom Servers Using FocalPoint Reduces System Cost and Improves System Flexibility, Jul. 2008, 7 pages.

James Radley, Load Balancing Between Server Blades Within Atca Platforms, Oct. 2007, 4 pages.

Cisco Systems, Inc., Cisco Data Center Infrastructure 2.5 Design Guide, Dec. 6, 2007, 180 pages.

Final Office Action in related U.S. Appl. No. 12/902,703, mailed on Jan. 22, 2013; 15 pages.

Final Office Action in related U.S. Appl. No. 12/664,060, mailed on Mar. 18, 2013; 26 pages.

Non-Final Office Action in related U.S. Appl. No. 12/664,060, mailed Sep. 13, 2012; 17 pages.

Non-Final Office Action in related U.S. Appl. No. 12/902,703, mailed Aug. 30, 2012; 15 pages.

Cisco Systems, The Global Server Load Balancing Primer, White Paper by Cisco Systems, 2004, 20 pages.

Notice of Allowance and Fee(s) Due in related U.S. Appl. No. 12/664,060, mailed on Jun. 12, 2013; 15 pages.

Notice of Allowance and Fee(s) Due in related U.S. Appl. No. 12/741,225, mailed on May 29, 2013; 10 pages.

Non-Final Office Action in related U.S. Appl. No. 12/741,225, mailed May 3, 2012; 14 pages.

Non-Final Office Action in related U.S. Appl. No. 12/902,703, mailed on May 21, 2014; 27 pages.

Singh, Sumeet, et al. "Service Portability", Record of the 5th Workshop on Hot Topics, Hot Nets V, Irvine, CA, Nov. 29-30, 2006; 6 pages.

* cited by examiner

| SEQ. | TRAFFIC DIRECTION | SRC MAC | DEST MAC (DMAC) | SRC IP | DEST IP (DIP) | SRC PORT | DEST PORT (DPORT) |
|---|---|---|---|---|---|---|---|
| 152 | CLIENT TO SWITCH | CMAC | RMAC | CIP | RIP | CPORT | RPORT |
| 154 | SWITCH TO REAL SERVER | CMAC | RMAC | CIP | RIP | CPORT | RPORT |
| 158 | REAL SERVER TO SWITCH | RMAC | CMAC | RIP | CIP | RPORT | CPORT |
| 160 | SWITCH TO CLIENT | RMAC | CMAC | RIP | CIP | RPORT | CPORT |

FIG. 4

| SEQ. | TRAFFIC DIRECTION | SRC MAC | DEST MAC (DMAC) | SRC IP | DEST IP (DIP) | SRC PORT | DEST PORT (DPORT) |
|---|---|---|---|---|---|---|---|
| 152 | CLIENT TO SWITCH | CMAC | VMAC | CIP | VIP | CPORT | VPORT |
| 154 | SWITCH TO REAL SERVER | CMAC | RMAC | CIP | VIP | CPORT | VPORT |
| 158 | REAL SERVER TO SWITCH | RMAC | CMAC | VIP | CIP | VPORT | CPORT |
| 160 | SWITCH TO CLIENT | RMAC | CMAC | VIP | CIP | VPORT | CPORT |

FIG. 5

| SEQ. NO. | TRAFFIC DIRECTION | SRC MAC | DEST MAC (DMAC) | SRC IP | DEST IP (DIP) | SRC PORT | DEST PORT (DPORT) |
|---|---|---|---|---|---|---|---|
| 252 | CLIENT TO SWITCH | CMAC | RMAC | CIP | RIP | CPORT | RPORT |
| 256 | SWITCH TO TRANS. PROXY SERVER | CMAC | PMAC | CIP | RIP | CPORT | RPORT |
| 260 | TRANS. PROXY SERVER TO SWITCH | PMAC | RMAC | PIP | RIP | PPORT | RPORT |
| 262 | SWITCH TO REAL SERVER | PMAC | RMAC | PIP | RIP | PPORT | RPORT |
| 266 | REAL SERVER TO PROXY SERVER | RMAC | PMAC | RIP | PIP | RPORT | PPORT |
| 268 | SWITCH TO PROXY SERVER | RMAC | PMAC | RIP | PIP | RPORT | PPORT |
| 272 | PROXY SERVER TO SWITCH | PMAC | CMAC | RIP | CIP | RPORT | CPORT |
| 274 | SWITCH TO CLIENT | PMAC | CMAC | RIP | CIP | RPORT | CPORT |

*FIG. 9*

| SEQ. NO. | TRAFFIC DIRECTION | SRC MAC | DEST MAC (DMAC) | SRC IP | DEST IP (DIP) | SRC PORT | DEST PORT (DPORT) |
|---|---|---|---|---|---|---|---|
| 304 | CLIENT TO SWITCH | CMAC | VMAC | CIP | VIP | CPORT | VPORT |
| 306 | SWITCH TO OFFLOADER APPLIANCE. | CMAC | PMAC | CIP | VIP | CPORT | VPORT |
| 310 | OFFLOADER APPLIANCE TO SWITCH | PMAC | VMAC | PIP | VIP | RPORT | 80 |
| 312 | SWITCH TO REAL SERVER | PMAC | RMAC | PIP | RIP | RPORT | 80 |
| 314 | REAL SERVER TO SWITCH | RMAC | PMAC | VIP | PIP | 80 | RPORT |
| 318 | SWITCH TO PROXY APPLIANCE | RMAC | PMAC | VIP | PIP | 80 | RPORT |
| 322 | PROXY SERVER TO SWITCH | PMAC | CMAC | RIP | CIP | RPORT | CPORT |
| 324 | SWITCH TO CLIENT | PMAC | CMAC | RIP | CIP | RPORT | CPORT |

*FIG. 12*

TRAFFIC MANAGEMENT OF CLIENT TRAFFIC AT INGRESS LOCATION OF A DATA CENTER

RELATED APPLICATIONS

This application is continuation-in-part of U.S. patent application Ser. No. 12/741,225, filed May 4, 2010, which is a national stage entry of PCT application no. PCT/US2008/082707, filed Nov. 7, 2008, which claims priority from U.S. provisional application No. 60/986,842, filed on Nov. 9, 2007, and priority from U.S. provisional application No. 61/018,047, filed on Dec. 31, 2007, the entireties of which applications are incorporated by reference herein.

FIELD OF THE INVENTION

The invention relates generally to packet-forwarding systems. More particularly, the invention relates to hardware-based switching mechanisms for managing traffic across servers in a server group.

BACKGROUND

Traditionally, devices that perform traffic management, for example, load balancing among networked servers, use software and hardware. The software usually operates to setup and tear down traffic flows, whereas the hardware accelerates the delivery of the traffic. Because of their dependency on the software, such devices cannot achieve line rate (i.e., the nominal speed of data transmission). In general, a device is limited by the speed at which the network processor can process software instructions. In addition, the software often employs a session table to record the states of the traffic flows. Consequently, the number of sessions that the device can process is constrained by the amount of memory installed on the system.

FIG. 1 illustrates traditional server load balancing operation in a data switch module 10 having a network processor 12 that runs a server load balancing agent (hereafter, software SLB agent 14) and a server load balancing processing agent (hereafter, hardware SLB agent 16) that forwards the traffic flows in accordance with the software SLB agent 14. The software SLB agent 14 is in communication with a session table 18 stored in memory 20. Packet traffic from a client system 22 arrives (arrow 1) at the switch module 10. The hardware SLB agent 16 forwards (arrow 2) the packet to the software SLB agent 14. After consulting the session table 18, the software SLB agent 14 returns (arrow 3) a packet to the hardware SLB agent 16. The hardware SLB agent 16 sends (arrow 4) the packet to a server in a server farm 24 (the particular server being selected based on load balancing criteria). A packet returns (arrow 5) from the server farm 24 to the hardware SLB agent 16, which sends (arrow 6) the packet to the software SLB agent 14. The software agent 14 returns (arrow 7) a packet to the hardware SLB agent 16, which sends (arrow 8) the packet to the client system 22. Herein, arrows 1 through 8 correspond to packet traffic for setting up (or tearing down) a session between the client system 22 and the server. After a session is established, the client system 22 and the server in the server farm 24 communicate 26 through the hardware SLB agent 16 (the traffic does not pass through the software SLB agent 14). The performance of the load balancing is limited by the speed at which the software SLB agent 14 can process the packet traffic, and the number of sessions that the system can handle is limited by the amount of memory 20 in the system.

SUMMARY

In one aspect, the invention features a method of forwarding incoming client traffic to servers in a group of servers. A packet is received from a client system. The packet includes a packet header with source and destination MAC (Media Access Control) address fields, source and destination IP (Internet Protocol) address fields, and source and destination service port fields. Provided is a switch device with a packet forwarding table for providing traffic management across servers in a server group. The packet forwarding table has a plurality of table entries. Each table entry maps a hash value to a server in a server group. The switch device computes a hash value from data in one or more fields of the packet header of the received packet. The switch device uses the computed hash value as an index into the packet forwarding table to access a table entry therein and to identify, from the table entry, the server in the server group to which the table entry maps the computed hash value. The switch device forwards the packet to the identified server.

In another aspect, the invention features a switch device comprising a plurality of ports connected to servers in a server group and a packet forwarding table for use in managing traffic among servers in a server group. The packet forwarding table has a plurality of table entries. Each table entry maps a hash value to one of the ports connected to the servers in the server group. A frame processor has logic configured to receive a packet from a client system. The packet includes a packet header with source and destination MAC (Media Access Control) address fields, source and destination IP (Internet Protocol) address fields, and source and destination service port fields. The frame processor further comprises logic to compute a hash value from data in one or more of the fields of the packet header, to use the computed hash value as an index into the packet forwarding table to access a table entry therein and identify from the table entry the port to which the table entry maps the computed hash value, and to forward the packet to each server in the server group connected to that port.

In another aspect, the invention features a blade server rack comprising a plurality of servers and a switch device having a plurality of ports. Each port is connected to one of the plurality of servers. The switch device has a packet forwarding table for use in managing traffic among the plurality of servers. The packet forwarding table has a plurality of table entries. Each table entry maps a hash value to one of the servers. The switch further includes a frame processor with logic configured to compute a hash value from data in one or more of the fields of a packet header of a received packet. The fields of the packet header include source and destination MAC (Media Access Control) address fields, source and destination IP (Internet Protocol) address fields, and source and destination service port fields. The frame processor further comprises logic configured to use the computed hash value as an index into the packet forwarding table to access a table entry therein, to identify from the table entry the port to which the computed hash value maps, and to forward the packet to each server connected to the identified port.

In another aspect, the invention features a chipset comprised of one or more integrated circuit devices. The chipset comprises a packet forwarding table having a plurality of table entries. Each table entry maps a hash value to a port of a switch device connected to a server in the server group. A frame forwarder is configured to forward packets between ports of the switch device. A frame processor is configured to receive a packet, to examine a header of the packet having source and destination MAC (Media Access Control) address fields, source and destination IP (Internet Protocol) address fields, and source and destination service port fields, to compute a hash value from data in one or more of the fields of the header, and to use the computed hash value as an index into the packet forwarding table to access a table entry therein and identify from the table entry the port to which the table entry maps the computed hash value. Logic of the frame forwarder is configured to forward the packet to the port identified by the frame processor.

In still another aspect, the invention features a data center, comprising a plurality of blade server racks. Each blade server rack includes a plurality of servers and a switch device having a plurality of ports. The switch device is physically connected to a first one of the servers of that blade server rack through one of the ports and to a second one of the servers of that blade server rack through another of the ports. Each switch device further comprises a packet forwarding table for use in providing traffic management across servers in a server group. The packet forwarding table has a plurality of table entries. Each table entry maps a hash value to a server in the server group. A frame forwarder is configured to switch packets between ports of that switch device. A frame processor has logic configured to compute a hash value from data in one or more of the fields of a packet header of a received packet. The fields of the packet header include source and destination MAC (Media Access Control) address fields, source and destination IP (Internet Protocol) address fields, and source and destination service port fields. The frame processor further comprises logic configured to use the computed hash value as an index into the packet forwarding table to access a table entry therein and identify from the table entry the server in the server group to which the table entry maps the computed hash value. Logic of the frame forwarder is configured to forward the packet to the identified port.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 4 is a table illustrating header contents of packets forwarded during a first example illustration of the process of FIG. 2.

FIG. 5 is a table illustrating header contents of packets forwarded during a second example illustration of the process of FIG. 2.

FIG. 9 is a table showing the header contents of various packets forwarded to and from the switch device of FIG. 8 during the process of FIG. 7.

FIG. 12 is a table showing the header contents of various packets forwarded to and from the switch device of FIG. 11 during the process of FIG. 10.

DETAILED DESCRIPTION

Figure 1:
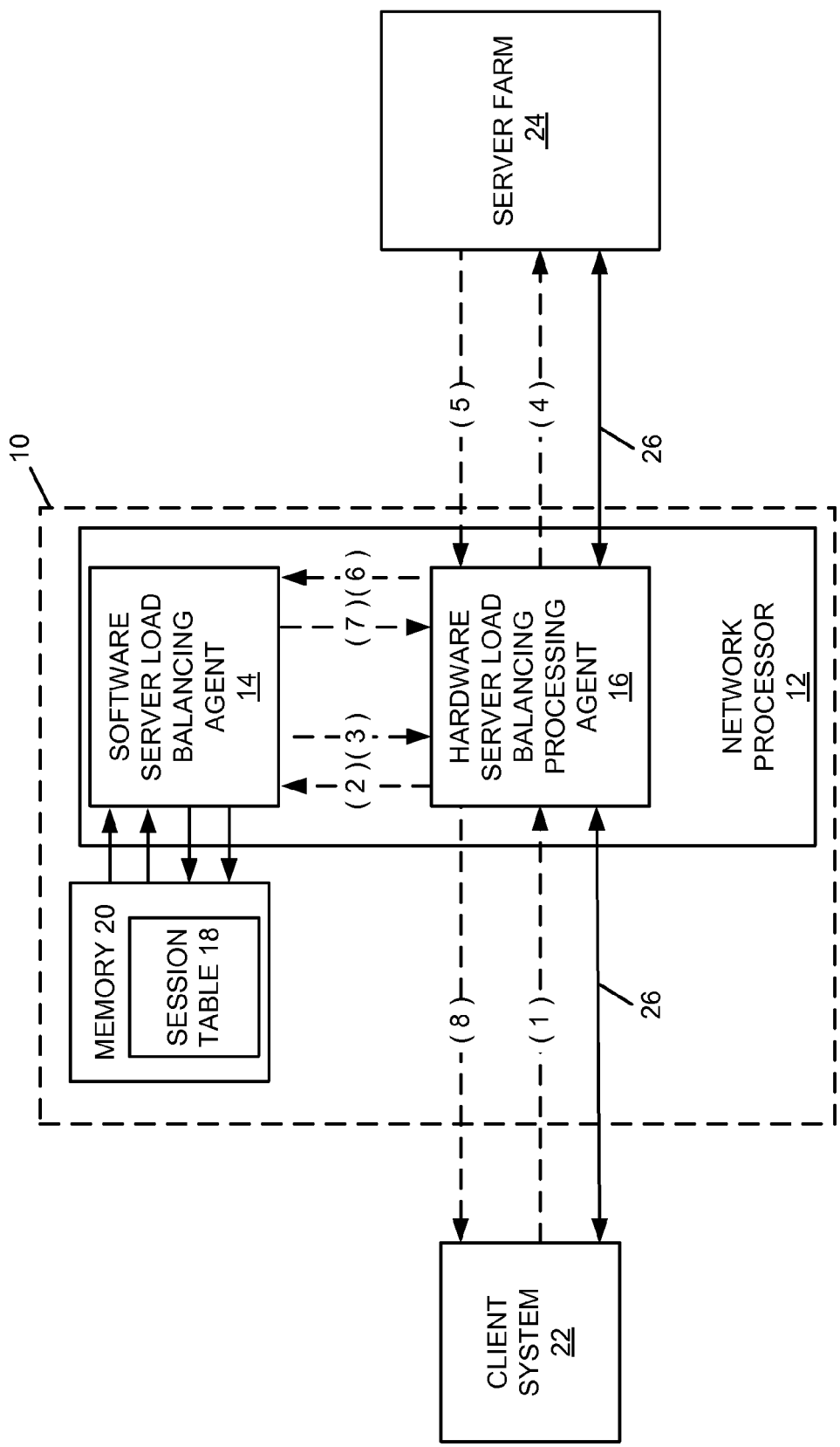
FIG. 1 is a diagram of a switch module engaged in traditional server load balancing behavior.

Systems, packet switches, and switch devices constructed in accordance with the invention "sessionlessly" execute traffic management decisions across servers in hardware. "Sessionlessly", as used herein, refers to the ability to direct packets belonging to particular client traffic flows towards their destinations without having to record and access the state of each traffic flow in a session table. Beneficially, the invention eliminates any need for a software server load-balancing agent (as described in FIG. 1) and leads to a savings in system memory traditionally used to store a session table. Moreover, the use of hardware to execute traffic management decisions enables packet switching at the line rate of the switch ports (e.g., 10 Gb).

Figure 2:
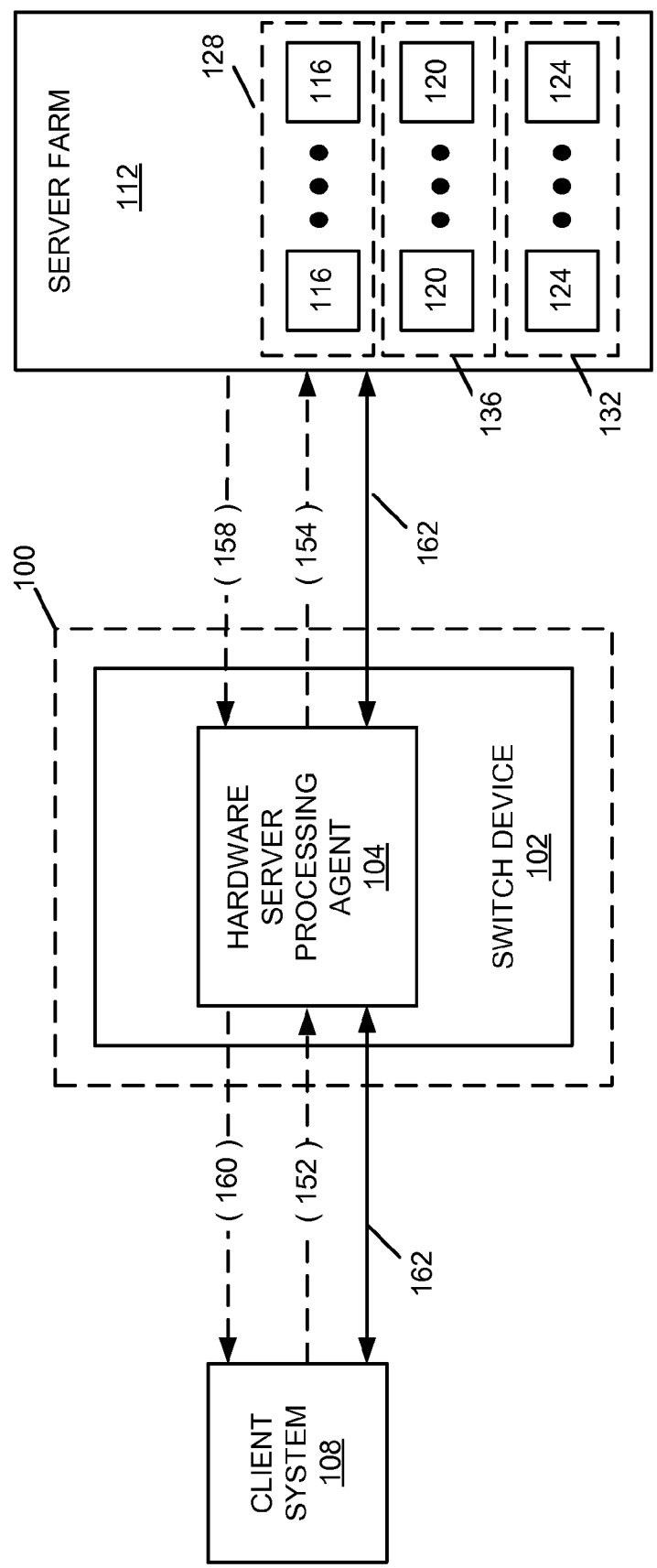
FIG. 2 is a functional block diagram representation of an embodiment of a switch device engaged in traffic management in accordance with the invention.

FIG. 2 shows a switch module 100 for performing traffic management operations in accordance with the principles of one embodiment of the invention. Traffic management operations can include load balancing client traffic among servers in a server group. In general, the switch module 100 is disposed at an interface between client systems and servers within a data center. The switch module 100 includes a switch device 102 with a hardware-implemented SLB processing agent 104 (hereafter, hardware SLB agent) that is in communication with a client system 108 (also called a host) and with a server farm 112.

The hardware SLB agent 104 is comprised of special-purpose circuitry configured to make traffic management decisions, for example, load balancing, for client traffic flows handled by the switch module 100 across the servers in the server farm 112, as described herein. In brief, the hardware SLB processing agent 104 handles the traffic flow of entire sessions to achieve 10 GB line rate per port. By having the hardware SLB processing agent 104 handle all traffic, the switch module is not limited by the processing power and system memory of a software SLB agent.

The server farm 112 includes a plurality of servers or server blades. The servers of the server farm 112 can include transparent proxy servers 116, non-transparent proxy servers (not shown), proxy appliances 120, real servers 124, and combinations thereof. In general, a transparent proxy server 116 processes client system requests, which have been addressed by the client systems to a real server, in a fashion transparent (i.e., unknown) to the user of the client system. For example, a client system may have submitted an https: request to a real server address, and, before the real server can process the request, a transparent server intervenes and examines the request to verify the security of the request.

Servers of a common type may be grouped, and traffic management, for example, load balancing, traffic prioritization, Service Level Agreement (SLA) enforcement, selective remote data backup, cached data retrieval, can be performed across servers of a given group as described herein. For example, a given transparent proxy server 116 can belong to a transparent proxy server group 128, proxy appliances can belong to a proxy appliance group 136, and a given real server 124 can belong to a real server group 132. In general, the servers in a group perform the same type of work. For example, all of the servers of a transparent proxy server may perform the task of verifying the security of a packet. The servers of the server farm 112 can be collocated within a single chassis (with or without the switch module 100) or be installed in a plurality of chassis.

Figure 3:
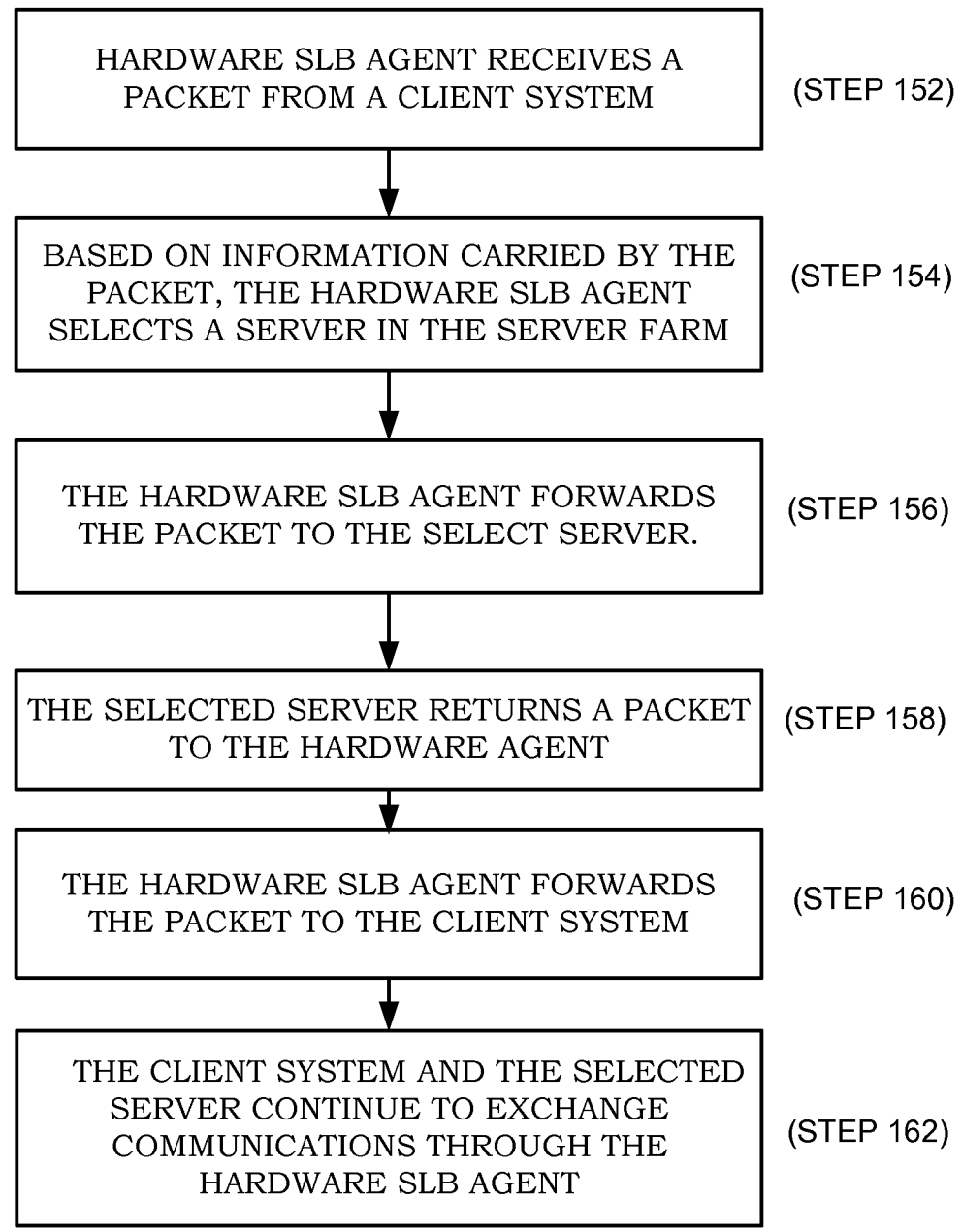
FIG. 3 is a flow diagram of an embodiment of process for performing traffic management in accordance with one embodiment of the invention.

FIG. 3 shows an embodiment of a general process 150 performed by the switch module 100 to establish a session between the client system 108 and a server in a server farm 112. Some of the reference numerals given to steps recited in connection with FIG. 3 have correspondingly numbered arrows shown in FIG. 2. At step 152, the hardware SLB agent 104 receives an incoming packet (or frame) from the client system 108. Based on selected frame header information carried by the packet, the hardware SLB agent 104 selects (step 154) a server in the server farm 112, and then forwards (step 156) the packet to the selected server. The server returns (step 158) a packet to the hardware SLB agent 104, which forwards (step 160) the packet to the client system 108. Communications exchanged (step 162) after the session is established between the client system 108 and the selected server continue to pass through the hardware SLB agent 104.

As described further below, the selection of the server can be based on a hash of destination address information and/or on a hash of source address information in the packet header, depending upon the particular embodiment of the hardware SLB agent 104. In one embodiment, the destination address information used to select a server includes any one or combination of the MAC address of the real server to which the packet is addressed, referred to as RMAC, the IP address of the real server, referred to as RIP, and the service port that the real server is listening to, referred to as RPORT. The particular field(s) used for the hash is user selectable. To compute a hash value, in one embodiment, a bit mask is applied to the user-selected field(s). FIG. 4 shows, in table format, the contents of the packet headers in accordance with this embodiment. The sequence numbers in the table of FIG. 4 correspond to the numbered arrows of FIG. 2 and to the step numbers of FIG. 3.

In another embodiment, referred to as direct server return, the destination address information in each packet received from a client system 108 includes a Virtual MAC (VMAC) address, a Virtual IP (VIP) address, and a virtual server service port (VPORT). In this embodiment, each real server 124 in the server farm 112 is assigned the same VMAC address, the same VIP address, and the same Virtual Server service port. In addition, each real server 124 configures 2 different IP addresses on its network interface card. One of the configured IP addresses is the VIP, and the other is the actual IP address of the real server. Accordingly, the client systems issue packets with the VIP and VMAC addresses, and source address information in the headers of such packets, such as the source MAC address or source IP address, is used to select the server to which to forward the packet. The particular field(s) used in the selection of the server is user selectable, and the hardware SLB agent 104 of the switch device 102 computes a hash value based on the selected field(s). In one embodiment, a bit mask is applied to the user-selected field(s) to compute this hash value.

Because all real servers have configured the same VIP, the switch device 102 filters out all traffic from real servers 124 that advertise this VIP. This filtering prevents the real servers 124 in a chassis from objecting to a duplicated IP address configured on another real server. In addition, if external devices (i.e., client/host systems) issue an ARP (address resolution protocol) probe for the VIP, the switch device 102 intercepts such ARP requests and returns the VIP with the VMAC. Although only one group 132 of real servers 124 is shown, the switch device 102 may be in communication with more than one group—and each group of real servers has its own unique VMAC and VIP addresses.

FIG. 5 shows, in table format, the contents of the packet headers in accordance with this embodiment (i.e., direct server return). The sequence numbers correspond to the numbered arrows of FIG. 2 and step numbers of FIG. 3. A packet arrives at the switch device 102 with the VMAC, VIP, and VPORT addresses. The switch device 102 changes the VMAC address in the packet header to the RMAC address of a selected real server (selected in accordance with a traffic-management mechanism described below). The packet header also includes the client MAC address (CMAC), the client IP address (CIP), and the service port (CPORT) of the client system 108 that issued the request. The flow of packet traffic is referred to as direct server return because the real server 124 in the server farm 112 that receives and processes the forwarded packet traffic sends back, in response, packet traffic (e.g., a client-requested Web page) directly to the switch device 102. The source MAC, IP, and Port addresses in the returned packet traffic are the RMAC, VIP, and VPORT addresses of the real server that handled the request; the destination addresses in the returned packet traffic are CMAC, CIP, and CPORT of the client system that requested information. The switch device 102 forwards the packet traffic received from the real server 124 to the client system 108.

Figure 6:
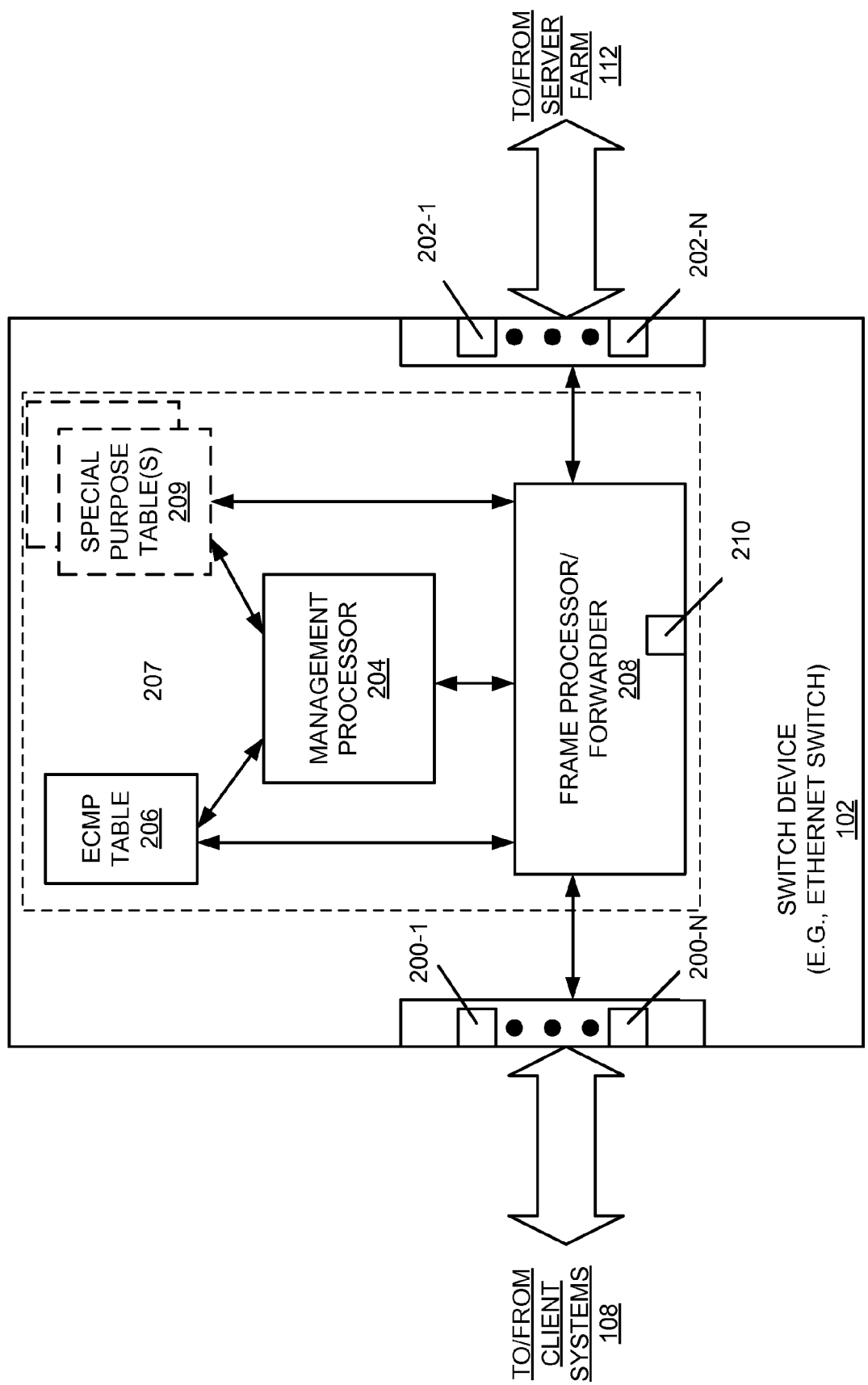
FIG. 6 is a functional block diagram representation of an embodiment of a switch device used to control traffic flows among servers.

FIG. 6 shows an example embodiment of the switch device 102 of FIG. 2 comprising a plurality of ports 200-1, 200-N (generally, 200) that are in communication with client systems 108, and a plurality of ports 202-1, 202-N (generally, 202) that are in communication with servers of the server farm 112. The switch device 102 can have fewer or more than the number of ports shown. The switch device 102 includes a management processor 204, an Equal Cost Multi-Path (ECMP) table 206, a frame processor/forwarder 208, and zero, one, or more special-purpose tables 209. In one embodiment, the ports 200, 202 of the switch device 102 support 10 GB line rates. The switch device 102 can be implemented with ASIC (Application Specific Integrated Circuit) technology on one or more semiconductor chips 107. In one embodiment, the switch device 102 is a 10 Gb Ethernet switch chip.

The ECMP table 206 contains information that directs the forwarding of ingress client traffic. In general, ECMP is a forwarding mechanism that routes packets along multiple paths of equal cost. Each entry of the ECMP table 206 maps a unique hash value to a server in the server farm 112. The result of hashing is to distribute the various client traffic flows across the servers in a server group. Thus, ECMP aims to distribute the client traffic load equally across the paths. Depending on the health of the servers, the management processor 204 dynamically adds or removes server entries from the ECMP table 206.

As described further below, the special-purpose table(s) 209 is used for particular traffic-management applications, for example, traffic prioritization, Service Level Agreement (SLA) enforcement, selective remote data backup, and cached data retrieval. Like those of the ECMP table 206, each entry of a special-purpose table 209 maps a hash value to a server port. Embodiments of switch devices 102 that have such table(s) 209 can use them in conjunction with or instead of the ECMP table 206. Alternatively, the special-purpose table(s) 209 can be implemented as special-purpose entries within the ECMP table 206, instead of as separate tables.

The frame processor/forwarder 208 includes hardware logic 210 for executing the flow distribution process, as described herein. The logic 210 may be implemented as hardware, software, or a combination of hardware and software. In general, the logic 210 examines specific content in the header of a received frame, generates a hash value based on header content of the frame, uses the generated hash value as an index into the ECMP table 206, and, based on the server identified in the accessed table entry, redirects the frame to a particular port of the switch device 102.

In one embodiment, the frame processor/forwarder 208 is configured to redirect a particular client traffic flow to a particular transparent proxy server 116 of the server farm 112. A hash function is performed using one or two configurable fields via SMAC only, DMAC only, SMAC and DMAC, SIP only, DIP only, or SIP and DIP in the header of the packet. The particular field or fields to be used are user selectable. As examples, these values can be summed and then hashed, or concatenated and then hashed. As another example, a bit mask can be applied to the user-selected field(s) to obtain the hash value.

The resulting hash value is used as a table index to access a table entry in the ECMP table 206, which maps the hash value to the particular transparent proxy server 116. Each packet belonging to a particular client traffic flow (or session) has the same destination information (DMAC, DIP, and DPORT), and, therefore, the resulting hash value of every packet of that client traffic flow maps to the same entry in the ECMP table 206. This consistent mapping ensures that the frame processor/forwarder 208 forwards each packet of the given traffic flow to the same transparent proxy server 116.

The frame processor/forwarder 208 can also be configured to redirect all ingress client traffic to the transparent proxy servers 116 in a transparent proxy server group. For this configuration, the entries of the ECMP table map hash values to the transparent proxy servers 116 in a transparent proxy server group, and traffic management, as determined by the ECMP table 206, is achieved across the transparent proxy servers. The frame processor/forwarder 208 makes a next routing decision by performing a hash operation based on selected fields of the packet header, accessing the ECMP table 206 using the resulting hash value as a table index to access a table entry, and identifying the transparent proxy server in the group corresponding to that entry.

In the direct server return embodiment, the frame processor/forwarder 208 is configured to redirect a particular client traffic flow to a particular offloader proxy appliance 102 of the server farm 112. A hash function is performed based on selected field(s) in the header of the packet. As an example, the hash function can be to apply a bit mask that masks out all but the three least significant bits of an address field (i.e., the computed hash value equals those three least significant bits). Again, the resulting hash value is used as a table index to access a table entry in the ECMP table 206, which maps the hash value to an offloader proxy appliance 120.

The management processor 204 checks the health of the servers in the server farm 112. A given proxy server can belong to the proxy server group and a given real server can belong to a real server group only if that server is in a healthy state. The management processor 204 constantly monitors the health of proxy and real servers by using various health-check mechanisms. Examples of such health-check mechanisms include, but are not limited to, a link-state health check, a PING health check, a UDP/TCP (User Datagram protocol/ Transmission Control Protocol) health check, and a service-based health check. An administrator configures the particular health-check mechanism used by the switch device 102.

When a server failure occurs (a proxy server or a real server), the failing server is removed from its server group. The traffic that was flowing to the healthy servers in the affected server group continues to flow persistently to those healthy servers. The traffic that was flowing to the failed server is redistributed to the healthy servers in the affected server group. This redistribution is accomplished by changing the table entry with the hash value that maps to the failed server so that the hash value now maps to one of the healthy servers in the affected server group.

In one embodiment, the decision as to which healthy server to use is based on the health of the server with the next index value. For example, consider a server group of four servers, numbered 1, 2, 3, and 4. The ECMP table 206 has 4 entries; each entry in the ECMP table maps a hash value to a different one of the 4 servers. A first hash value maps to server number 1, a second hash value maps to server number 2, a third hash value maps to server number 3, and a fourth hash value maps to server number 4. If server number 2 fails, while servers numbered 1, 3 and 4 remain healthy, server number 3 replaces the position of server number 2 in the hash table. More specifically, the first hash value continues to map to server number 1, the second hash value now maps to server number 3, the third hash value continues to map to server number 3, and the fourth hash value continues to map to server number 4. If, instead, server number 4 fails, the fourth hash value is changed to map to server number 1 (wraps around).

Figure 7:
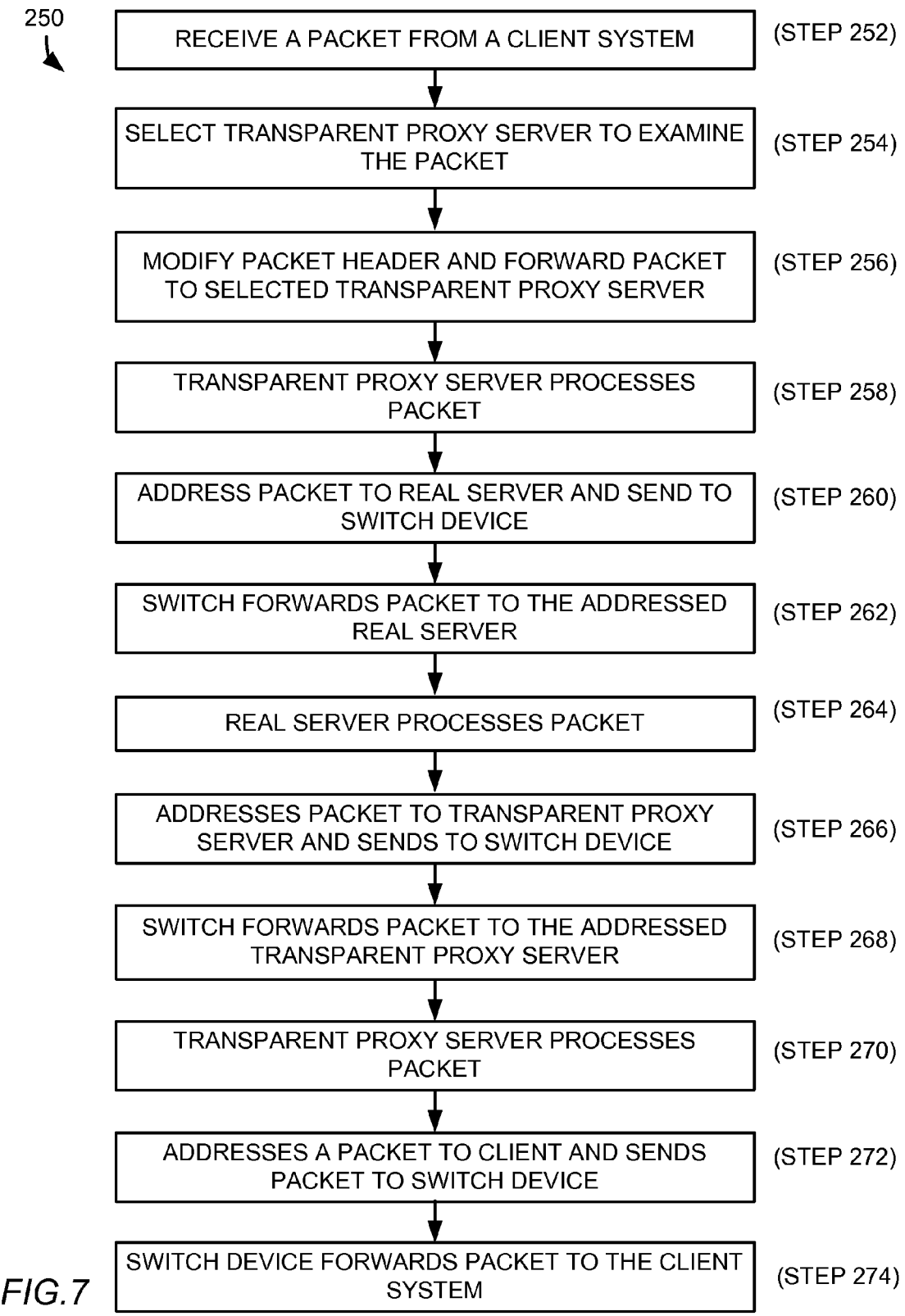
FIG. 7 is a flow diagram of an embodiment of a process of redirecting incoming client traffic to transparent proxy servers in a transparent proxy server group.

FIG. 7 shows an example embodiment of a process 250 by which the switch device 102 redirects incoming client traffic to transparent proxy servers 116 in a transparent proxy server group 128. The distribution (e.g., load balancing) of ingress client traffic flows occurs transparently with respect to the client systems from which the traffic flows originate. During the process 250 described below, the switch device 102 is forwarding the client traffic to a select transparent proxy server 116.

Figure 8:
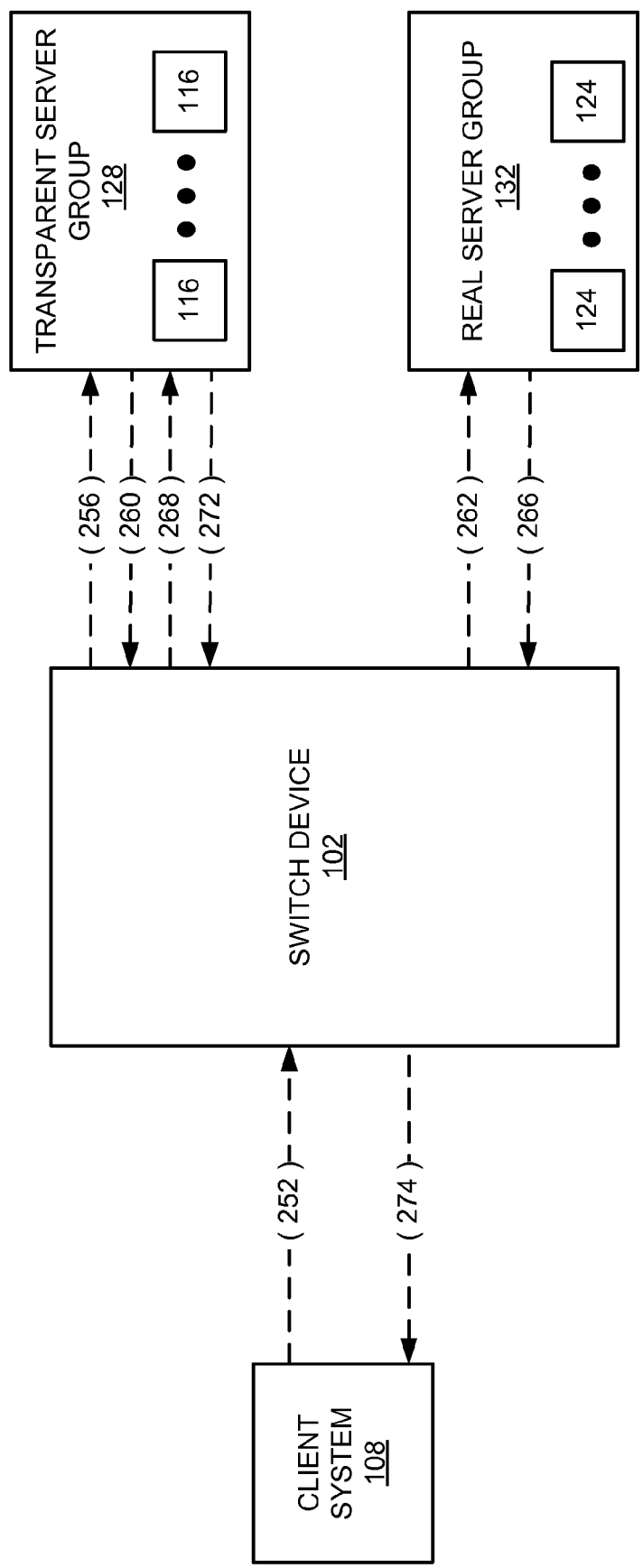
FIG. 8 is a functional block diagram representation of a switch device participating in the process of FIG. 7.

In the description of the process 250, reference is also made to FIG. 8, which shows the switch device 102 in communication with client systems 108, with a group of transparent proxy servers 116, and with a group of real servers 124; and to FIG. 9, which shows in table format the header contents of the various packets forwarded during the process 250. The numbered arrows in FIG. 8 represent packet traffic that passes between the various systems and servers; each numeral corresponds to one of the enumerated steps in FIG. 7.

In general, the switch device 102 provides a persistent path by sending all packets in the same flow of client traffic to the same transparent proxy server to "setup" and "tear down" that client traffic flow. Accordingly, the switch device 120 does not need to perform these "setup" and "tear down" operations. In addition, sending the same flow of traffic to the same transparent proxy server (using the hash function and ECMP table) dispenses with any need for the given switch module 100 to maintain the state of any particular client flow.

At step 252, the switch device 102 receives a packet from the client system 108. The source MAC address and source IP address are the MAC address (CMAC) and IP address (CIP), respectively, of the client system 108. The destination MAC address and destination IP address are the MAC address (RMAC) and IP address (RIP), respectively, of a real server 124 to which the packet is addressed. The source port is a client port (CPORT) and the destination port is a real server service port (RPORT).

The switch device 102 selects (step 254) a transparent proxy server 116 in the transparent proxy server group, in accordance with the server traffic management mechanism described above that is based on a hash of one or more fields of destination information. In addition, the switch device 102 changes the destination MAC address in the packet to the MAC address (PMAC) of the selected transparent proxy server and forwards (step 256) the packet accordingly.

The selected transparent proxy server 116 processes (step 258) the packet (e.g., to perform decryption) arriving from the switch device 102, and addresses a resulting packet to a real server 124 in the real server group. The source MAC address of the sent packet is PMAC, the source IP address is PIP, the source port is PPORT; the destination MAC address in the sent packet is RMAC (the MAC address of the real server), the destination IP address is RIP, and the destination port is RPORT. The transparent proxy server 116 sends (step 260) the packet to the switch device 102, and the switch device 102 forwards (step 262) the packet to the identified real server 124.

The real server 124 processes (step 264) the packet received from the switch device 102 and sends a packet (step 266) back to the transparent proxy server 116. The packet header has the RMAC as the source MAC address, the PMAC as the destination MAC address, the RIP as the source IP address, the PIP as the destination IP address, the RPORT as the source port, and the PPORT as the destination port. The switch device 102 forwards (step 268) the packet to the transparent proxy server 116.

At step 270, the transparent proxy server 116 processes the packet received from the switch device 102 (e.g., to encrypt the contents of the packet). The source and destination MAC addresses of the packet header of the resulting packet are PMAC and CMAC, respectively; the contents of the source and destination IP addresses are RIP and CIP, respectively; and the source and destination ports to RPORT and CPORT, respectively. The transparent proxy server 116 sends (step 272) the packet to the switch device 102, and the switch device 102 forwards (step 274) the packet to the client system 108.

Direct Server Return

Figure 10:
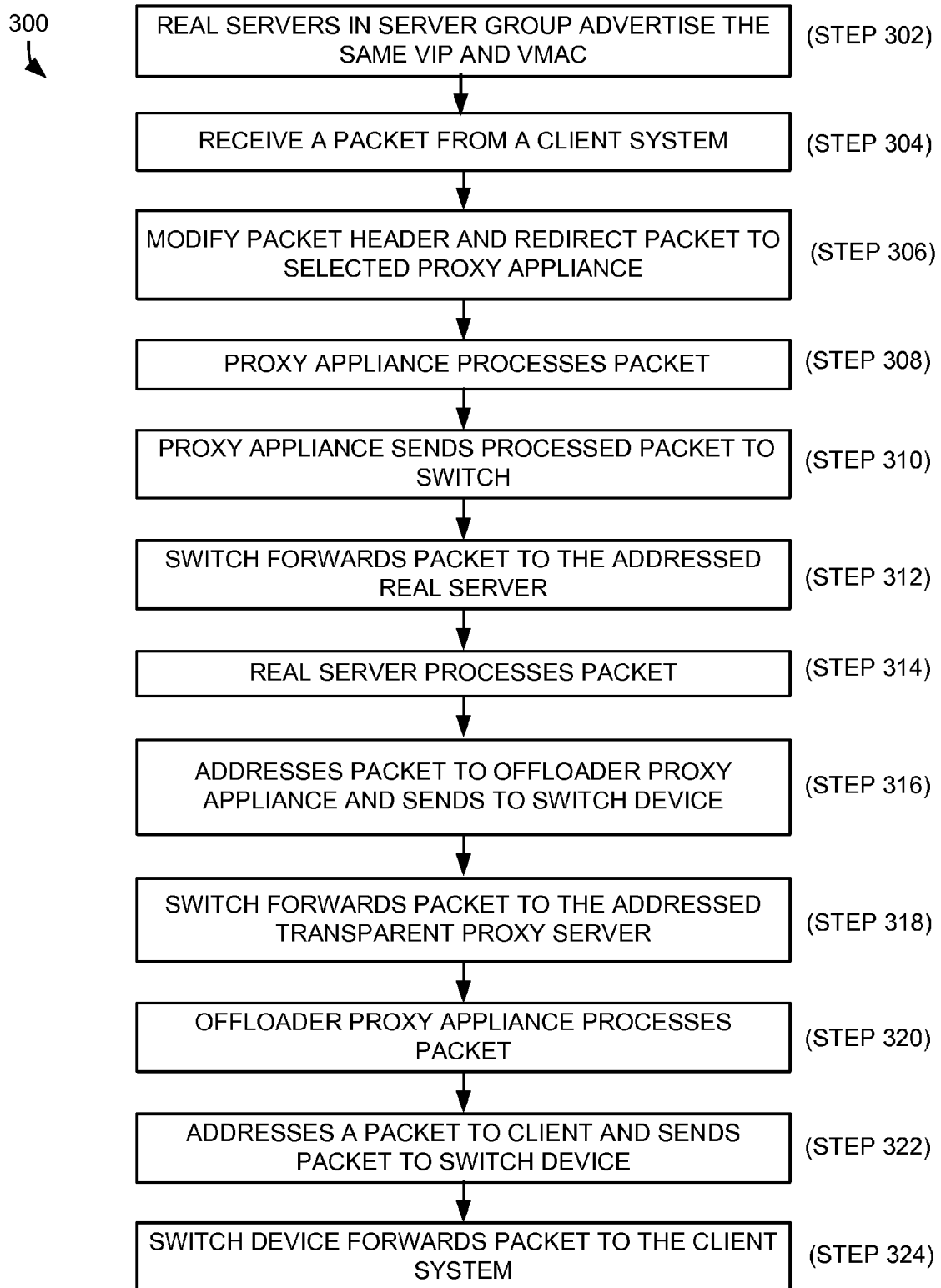
FIG. 10 is a flow diagram of an embodiment of a process of redirecting incoming client traffic to offloader proxy appliances in a proxy appliance group.
Figure 11:
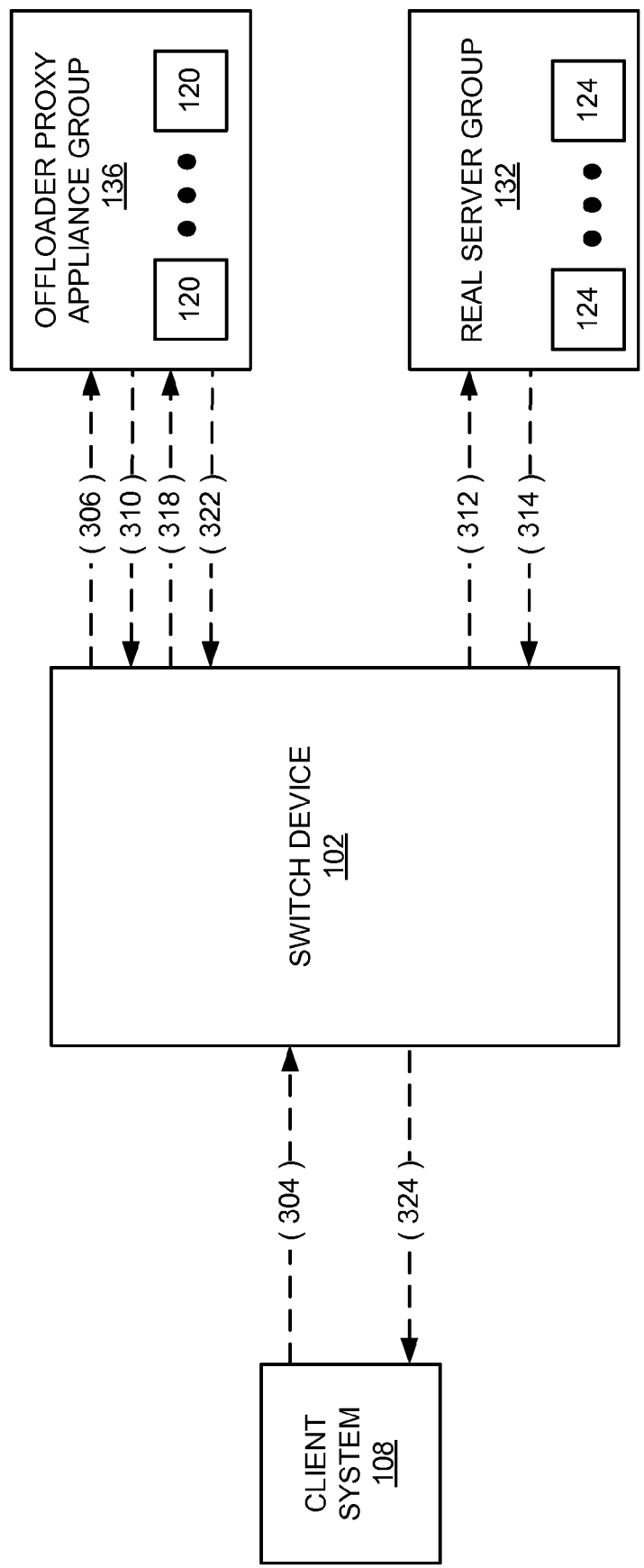
FIG. 11 is a functional block diagram representation of a switch device participating in the process of FIG. 10.

FIG. 10 shows an example embodiment of a process 300 by which the switch device 102 redirects incoming client traffic to offloader proxy appliances 120 and manages (e.g., load balances) the client traffic among real servers 124 in a real server group 132. In the description of the process 300, reference is also made to FIG. 11, which shows the switch device 102 in communication with the client system 108, with a group 136 of offloader proxy servers 120, and with a group 132 of real servers 124; and to FIG. 12, which shows in table format the header contents of the various packets forwarded during the process 300. The numbered arrows in FIG. 11 represent packet traffic that passes between the various systems and servers; each numeral corresponds to one of the enumerated steps in FIG. 10.

For this embodiment, each real server 124 in the real server group 132 advertises (step 302) the same VMAC and the same VIP addresses. Each packet of client traffic that arrives (step 304) at the switch device 102 is addressed to the same VIP and the VMAC (i.e., because of the advertisement of the same VIP and VMAC addresses for each real server). The source MAC address and source IP address are the MAC address (CMAC) and IP address (CIP), respectively, of the client system 108. The destination MAC address and destination IP address are the MAC address (VMAC) and IP address (VIP), respectively, of a virtual server. The source port is a client port (CPORT) and the destination port is a virtual server service port (VPORT).

The switch device 102 redirects (step 306) the client traffic to a select offloader proxy appliance 120. As previously described, the selection of the proxy appliance 120 is based on a hashed value of the source MAC address, source IP address, or a combination thereof. The switch device 102 changes the destination MAC address in the packet header to the MAC address (PMAC) of the selected proxy appliance 120 and forwards the packet.

The selected offloader proxy appliance 120 processes (step 308) the client traffic and returns (step 310) it to the switch device 102. The processing performed by the offloader proxy appliance 120 can be, for example, to decrypt the packet contents (e.g., if sent via the MIPS protocol). The packet header includes a source MAC address of PMAC, a destination MAC address of VMAC, a source IP address of PIP, a destination IP address of VIP, a source service port of RPORT, and a destination service port as port 80 (the port number of a Web server).

The switch device 102 then selects a real server 124 in the real server group 132 based on source address information as described above in connection with the direct server return embodiment, modifies the packet header to have a destination MAC address of RMAC and a destination IP address of RIP, and forwards (step 312) the packet to the selected real server 124.

The selected real server 124 receives and processes (step 314) the client traffic, and replies (step 316) directly to the switch device 102. The RMAC of the real server 124 is the source MAC address in the packet header, the PMAC of the proxy appliance that previously processed the client traffic is the destination MAC address, port 80 is the source service port, RPORT is the destination service port, the VIP is the source IP address, and the PIP is the destination IP address. The switch device 102 forwards (step 318) the reply to the offloader proxy appliance 120.

The offloader proxy appliance 120 processes (step 320) the reply (e.g., adding encryption, HTTPS) and returns (step 322) a processed reply to the switch device 102. The packet header contents includes source and destination MAC addresses of PMAC and CMAC, respectively, source and destination IP addresses of VIP and CIP, respectively, and source and destination ports of VPORT and CPORT, respectively. The switch device 102 forwards (step 324) the processed reply to the client system 108.

Examples of Traffic Management Applications

In addition to load balancing, the principles described herein apply to other types of traffic management, including, but not limited to, traffic prioritization, SLA enforcement, selective remote data backup, and cached data retrieval. For traffic-management applications, in general, the switch device examines one or more user-selected fields in the packet header of a received packet and, in response to the information in the one or more fields, performs an action. For example, the action taken by the switch device can be to redirect the traffic to a particular special-purpose table (such redirection being away from another table (e.g., the ECMP table) used for flow distribution). Select fields (e.g., MAC/IP fields) in the packet header of the redirected traffic are hashed to generate a hash index into a table entry of the special-purpose table. This table entry contains the server port information to which the switch forwards the traffic. Alternatively, instead of redirecting the traffic to the special-purpose table, the switch device can perform flow distribution by redirecting the traffic to a specific server port based on the information in the one or more user-select fields.

For example, for traffic prioritization applications, in one embodiment a separate, special-purpose table—separate from a table used to handle non-prioritized traffic, which is herein defined to include low priority traffic—is used specifically to service priority traffic. This special-purpose table is referred to herein as a priority table. Each entry in the priority table maps a hash value to a port of a server reserved to process priority traffic.

When priority traffic arrives at the switch device, the switch examines the priority field in the packet header and redirects the traffic to this priority table. Hashing of information in select fields of the packet header produces an index into the priority table that identifies a table entry. This table entry maps to a port (and, thus, to a corresponding server for processing priority traffic), and the switch device forwards the traffic through that port to the server.

In another embodiment, one or more table entries of the same table that maps hash values to servers (e.g., ECMP table 206) are dedicated specifically to priority traffic. In general, hashing header information of non-prioritized or low priority traffic does not produce a hash value that indexes to a dedicated entry, rather, such traffic hashes to other servers allocated to support such non-prioritized traffic. The switch device may distribute such non-prioritized traffic in load-balanced fashion across those other servers, as described above. With non-prioritized traffic being directed elsewhere, the dedicated entries map to lightly loaded or idle ports, which are thus readily available to forward priority traffic as soon as such traffic arrives at the switch device.

When priority traffic arrives at the switch device, the hashing of header information resolves to a dedicated entry, the dedicated entry maps to a lightly loaded or idle port, and the switch device forwards the traffic through that port to the server processing the prioritized traffic. In one embodiment, upon detecting incoming traffic with priority status, the switch device can modify the one or more fields in the header upon which the hashing function is performed so that the resulting hash value indexes to a dedicated entry. Alternatively, certain IP addresses can be specifically associated with prioritized traffic, and the hash values that result from hashing such IP addresses can be preconfigured to map to one or more entries dedicated to prioritized traffic.

The mechanism of dedicating a special-purpose table (or, in some embodiments, table entries) to certain types of traffic can apply also to applications for ensuring compliance with SLAs. Service level agreements, or SLAs, are generally contractual terms governing services offered by service providers to their customers. A service, as used herein, is a guarantee of transport of customer-offered traffic with specific performance commitments. The terms specified in the SLAs set forth deliverables against which the performances of services are measured. To manage their customer relationships effectively, service providers want to ensure that each of their services is performing in accordance with its corresponding SLA.

One technique for ensuring compliance with a SLA includes allocating one or more servers to support a given service, while allocating one or more other servers to support other types of traffic (e.g., Internet traffic, other services, etc.). In addition, one or more special-purpose tables are dedicated specifically to the given service. Each table entry of a dedicated table maps a hash value to a port of the switch device specifically assigned to forward the service traffic to a server supporting the given service. Reserving this port and the corresponding server for the given service ensures the availability of sufficient bandwidth. More than one port can be reserved to support the given service, thereby providing more available bandwidth than a single port. Accordingly, when traffic associated with the given service arrives at the switch device, the matching of certain header information of that service traffic resolves to a dedicated table and hashing on selected header information produces an index to a table entry containing its mapped port.

In selective remote data backup applications, some types of traffic (e.g., time-critical traffic, such as secure transactions) require immediate backup to a remote site, while other types of traffic (e.g., data retrieval requests) require less urgent treatment. To support these different types of traffic, one or more servers can be allocated to support time-critical traffic, while one or more other servers are allocated to support non-urgent traffic. One or more special-purpose tables are dedicated specifically to supporting time-critical traffic, and one or more other tables are used for traffic related to non-urgent traffic. In general, table entries of each special-purpose table reserved in support of time-critical traffic map to an open port, which is typically lightly loaded or idle, so that the traffic can be forwarded immediately to a server allocated to support time-critical traffic. Whereas, based on hash values produced by hashing packet header content, the switch device directs non-urgent traffic to those ports connected to servers allocated to support non-urgent traffic. The switch device may load balance the non-urgent traffic across those other ports.

By way of illustration, when a frame arrives at the switch device, the switch device determines from header information whether the frame is part of time-critical traffic. If time critical, the switch device can redirect the traffic to a special-purpose table associated with a server group dedicated to processing time-critical traffic, which hashes information in select one or more select fields of the packet header and maps to a port of a server in the server group. As an alternative embodiment, the switch device can modify the header information to cause the hashing function to produce a hash value that indexes to a table entry mapped to a server port dedicated for time-critical traffic. For each embodiment, the switch device delivers the frame to the port identified by the table entry, for forwarding to the server connected to that port.

In a cached data retrieval application, one or more servers may perform data retrieval (e.g., video processing), while one or more other servers provide data caching (referred to as cache servers). In addition, a given server may perform data retrieval and data caching. When the switch device receives a request for content, if the request is a first occurrence of a request for this content, the switch device directs the request to one of the servers involved in performing data retrieval (e.g., a hash of the IP address produces a pointer to a table entry associated with a port that is connected to that data retrieval server). After that server retrieves the requested content, the switch device returns the requested content to the requester (e.g., a client system) and has a copy of the content cached at one of the cache servers.

When another request arrives at the switch device for previously requested content, in one embodiment, the switch device directs the request to a data retrieval server based on a hash of the field or combination of fields used by the switch device for packet-forwarding purposes. When the data retrieval server receives the request and determines that the content is already cached, the data retrieval server modifies the packet header (e.g., changes the IP address, VLAN ID, or other frame attribute used by the switch device for packet-forwarding purposes), and returns the frame to the switch device. This modification by the data retrieval server is designed to cause the switch device to redirect the frame to a cache server that is caching the content. In response to the modified packet header information, the switch device performs a hash of the modified frame attribute, uses the resulting hash value as an index into its table (e.g., a special-purpose table or ECMP table), acquires a table entry that maps to a port of the given cache server where the content resides, and forwards the frame with the request for content to the cache server. In response to this request, the cache server returns the requested content to the switch device, which forwards the content to the requester.

In an alternative embodiment, the switch device recognizes from packet header information that this is a request for cached content, and modifies packet header information used for matching purposes (e.g., VLAN field). Based on matching this packet header information, the switch device can, for example, redirect the traffic to a special-purpose table for hashing on an entry to select the server port, redirect to a specific port or trunk, forward the packet via L2 (Layer 2), or drop the packet.

Although the various examples of traffic management applications are described separately, it is to be understood that implementations can include any combination of such applications. In addition, although the generation of a hash value is herein described as mapping to a single port, in other embodiments, the mapping can be to a group of ports, wherein each of the ports forwards the frame.

Embodiments of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific preferred embodiments, it should be understood by those skilled in the art that various changes in form and detail may be made therein without departing from the spirit and scope of the invention as defined by the following claims. For example, although illustrated herein with respect to mechanisms that can achieve a line rate of 10 Gb of the switch ports, the invention applies also to higher and lower line rates.

What is claimed is:

1. A method of forwarding incoming traffic to servers in a group of servers, the method comprising:
   receiving a packet from a client system, the packet including a packet header with source and destination MAC (Media Access Control) address fields, source and destination IP (Internet Protocol) address fields, and source and destination service port fields;
   providing a switch device with a packet forwarding table for use in managing traffic across servers in a server group, the packet forwarding table having a plurality of table entries, each table entry mapping a hash value to a server in the server group;
   redirecting incoming traffic to the packet forwarding table before computing a hash value;
   computing, by the switch device, the hash value from data in one or more fields of the packet header of the received packet;
   using, by the switch device, the computed hash value as an index into the packet forwarding table to access a table entry therein and to identify, from the table entry, the server in the server group to which the table entry maps the computed hash value; and
   forwarding, by the switch device, the packet to the identified server.

2. The method of claim 1, further comprising distributing, by the switch device, incoming traffic flows among the servers in the server group.

3. The method of claim 1, wherein one or more of the table entries map hash values to a given server used specifically to process priority traffic, while other table entries map hash values to other servers used to process non-prioritized traffic.

4. The method of claim 1, wherein one or more of the servers in the server group is dedicated to processing priority traffic and each table entry in the packet forwarding table maps to one of the servers dedicated to processing priority traffic, and further comprising determining from packet header information, by the switch device, that incoming traffic has priority status, and, in response to the priority status, redirecting the incoming traffic to the packet forwarding table before computing a hash value so that computed hash value maps to one of the servers in the server group used to process priority traffic.

5. The method of claim 1, wherein one or more table entries map hash values to a given server used specifically to process traffic belonging to a given service, while other table entries map hash values to other servers used to support traffic not part of the given service.

6. The method of claim 1, wherein one or more of the servers in the server group is dedicated to processing traffic belonging to a given service and each table entry in the packet forwarding table maps to one of the servers dedicated to process traffic belonging to the given service, and further comprising:
   determining from packet header information, by the switch device, that incoming traffic belongs to the given service; and,
   in response to the determination, redirecting the incoming traffic to the packet forwarding table before computing a hash value so that the computed hash value maps to one of the servers in the server group used to process traffic belonging to the given service.

7. The method of claim 1, wherein one or more of the servers in the server group processes time-critical traffic, and each table entry in the packet forwarding table maps the processing time-critical traffic to one of the servers, the method further comprising:
   determining, by the switch device, that incoming traffic is time-critical, and
   redirecting the incoming traffic, in response to the determination, to the packet forwarding table before computing a hash value so that the computed hash value is mapped to one of the servers that is processing time-critical traffic in the server group.

8. The method of claim 1, wherein one or more of the table entries maps hash values to a given server used specifically to process time-critical traffic, while other table entries map hash values to other servers processing non-urgent traffic.

9. The method of claim 1, wherein one or more of the table entries maps hash values to a given server to perform data retrieval, while other table entries map hash values to other servers for data caching, the method further comprising:
   directing an initial request for content to the given server to perform data retrieval and caching that content at a given one of the other servers for data caching; and
   directing a subsequent request for the content to the given one of the other servers caching that content.

10. A switch device, comprising
   a plurality of ports connected to servers in a server group;
   a packet forwarding table for use in managing traffic among servers in a server group, the packet forwarding table having a plurality of table entries, each table entry mapping a hash value to one of the ports connected to the servers in the server group; and
   a frame processor with logic configured to receive a packet from a client system, the packet including a packet header with source and destination MAC (Media Access Control) address fields, source and destination IP (Internet Protocol) address fields, and source and destination service port fields, the logic further configured to redirect incoming traffic to the packet forwarding table before computing a hash value, to compute the hash value from data in one or more of the fields of the packet header, to use the computed hash value as an index into the packet forwarding table to access a table entry therein and identify from the table entry the port to which the table entry maps the computed hash value, and to forward the packet to each server in the server group connected to that port.

11. The switch device of claim 10, wherein one or more of the table entries map hash values to a given server in the server group used specifically to process prioritized traffic, while other table entries map hash values to other servers in the server group used to process non-prioritized traffic.

12. The switch device of claim 10, wherein one or more of the servers in the server group is dedicated to processing priority traffic and each table entry in the packet forwarding table maps to one of the servers dedicated to processing priority traffic, and wherein the frame processor includes logic configured to determine that incoming traffic has priority status, and, in response to the priority status, to redirect the incoming traffic to the packet forwarding table before computing a hash value so that computed hash value maps to one of the servers in the server group used to process priority traffic.

13. The switch device of claim 10, wherein one or more table entries map hash values to a given server of the server group used specifically to process traffic belonging to a given service, while other table entries map hash values to other servers of the server group used to support traffic not part of the given service.

14. The switch device of claim 10, wherein one or more of the servers in the server group is dedicated to processing traffic belonging to a given service and each table entry in the packet forwarding table maps to one of the servers used for processing traffic belonging to the given service, and wherein the frame processor includes logic configured to determine that incoming traffic belongs to the given service, and, in response to the determination, to redirect the incoming traffic to the packet forwarding table before computing a hash value so that the computed hash value maps to one of the servers in the server group used to process traffic belonging to the given service.

15. The switch device of claim 10, wherein one or more of the table entries map hash values to a given server of the server group used specifically to process time-critical traffic, while other table entries map hash values to other servers of the server group used to process non-urgent traffic.

16. The switch device of claim 10, wherein one or more of the servers in the server group is used for processing time-critical traffic and each table entry in the packet forwarding table maps to one of the servers used for processing time-critical traffic, and wherein the frame processor includes logic configured to determine that incoming traffic is time-critical traffic, and, in response to the determination, to redirect the incoming traffic to the packet forwarding table before computing a hash value so that the computed hash value maps to one of the servers in the server group used to process time-critical traffic.

17. The switch device of claim 10, wherein one or more of the table entries map hash values to a given server of the server group used to perform data retrieval, while other table entries map hash values to other servers of the server group used for data caching, and wherein the frame processor includes logic configured to forward an initial request for content to the given server of the server group used to perform data retrieval, to cache that content at a given one of the other servers used for data caching, and to direct a subsequent request for the content to the other server of the server group caching that content.

18. A blade server rack, comprising
a plurality of servers;
a switch device having a plurality of ports, each port connected to one of the plurality of servers, the switch device having a packet forwarding table for use in managing traffic among the plurality of servers, the packet forwarding table having a plurality of table entries, each table entry mapping a hash value to one of the servers, the switch further including a frame processor with logic configured to redirect incoming traffic to the packet forwarding table before computing a hash value and to compute the hash value from data in one or more of the fields of a packet header of a received packet, the fields of the packet header including source and destination MAC (Media Access Control) address fields, source and destination IP (Internet Protocol) address fields, and source and destination service port fields, the frame processor further comprising logic configured to use the computed hash value as an index into the packet forwarding table to access a table entry therein, to identify from the table entry the port to which the computed hash value maps, and to forward the packet to each server connected to the identified port.

19. The blade server rack of claim 18, wherein one or more of the table entries map hash values to a given server used specifically to process prioritized traffic, while other table entries map hash values to other servers used to process non-prioritized traffic.

20. The blade server rack of claim 18, wherein one or more of the servers in the server group is dedicated to processing priority traffic and each table entry in the packet forwarding table maps to one of the servers dedicated to processing priority traffic, and wherein the frame processor includes logic configured to determine that incoming traffic has priority status, and, in response to the priority status, to redirect the incoming traffic to the packet forwarding table before computing the hash value.

21. The blade server rack of claim 18, wherein one or more table entries map hash values to a given server of the plurality of servers used specifically to process traffic belonging to a given service, while other table entries map hash values to other servers of the plurality of servers used to support traffic not part of the given service.

22. The blade server rack of claim 18, wherein one or more of the servers in the server group is dedicated to processing traffic belonging to a given service and each table entry in the packet forwarding table maps to one of the servers used for processing traffic belonging to the given service, and wherein the frame processor includes logic configured to determine that incoming traffic belongs to the given service, and, in response to the determination, to redirect the incoming traffic to the packet forwarding table before computing a hash value so that the computed hash value maps to one of the servers in the server group used to process traffic belonging to the given service.

23. The blade server rack of claim 18, wherein one or more of the table entries map hash values to a given server used specifically to process time-critical traffic, while other table entries map hash values to other servers used to process non-urgent traffic.

24. The blade server rack of claim 18, wherein one or more of the servers in the server group is used for processing time-critical traffic and each table entry in the packet forwarding table maps to one of the servers used for processing time-critical traffic, and wherein the frame processor includes logic configured to determine that incoming traffic is time-critical traffic, and, in response to the determination, to redirect the incoming traffic to the packet forwarding table before computing a hash value so that the computed hash value maps to one of the servers in the server group used to process time-critical traffic.

25. The blade server rack of claim 18, wherein one or more of the table entries map hash values to a given server used to perform data retrieval, while other table entries map hash values to other servers used for data caching, and wherein the frame processor further includes logic configured to forward an initial request for content to the given server used to perform data retrieval, to cache that content at a given one of the other servers used for data caching, and to direct a subsequent request for the content to the other server caching that content.

26. A chipset of a switch device comprised of one or more integrated circuits, comprising:
a packet forwarding table having a plurality of table entries, each table entry mapping a hash value to a port of the switch device connected to a server in the server group;
a frame forwarder configured to forward packets between ports of the switch device; and
a frame processor configured to receive a packet, to examine a header of the packet having source and destination MAC (Media Access Control) address fields, source and destination IP (Internet Protocol) address fields, and source and destination service port fields, to redirect the incoming traffic to the packet forwarding table before computing a hash value, to compute the hash value on the switch device from data in one or more of the fields of the header, and to use the computed hash value as an index into the packet forwarding table to access a table entry therein and identify from the table entry the port to which the table entry maps the computed hash value,
wherein logic of the frame forwarder is configured to forward the packet to the port identified by the frame processor.

27. The chipset of claim 26, wherein one or more of the table entries map hash values to a given server in the server group used specifically to process prioritized traffic, while other table entries map hash values to other servers in the server group used to process non-prioritized traffic.

28. The chipset of claim 26, wherein each table entry in the packet forwarding table maps to a server dedicated to processing priority traffic.

29. The chipset of claim 26, wherein one or more table entries map hash values to a given server of the server group used specifically to process traffic belonging to a given service, while other table entries map hash values to other servers of the server group used to support traffic not part of the given service.

30. The chipset of claim 26, wherein each table entry in the packet forwarding table maps to a server used to process traffic belonging to a particular service.

31. The chipset of claim 26, wherein one or more of the table entries map hash values to a given server of the server group used specifically to process time-critical traffic, while other table entries map hash values to other servers of the server group used to process non-urgent traffic.

32. The chipset of claim 26, wherein each table entry in the packet forwarding table maps to a server used for processing time-critical traffic.

33. The chipset of claim 26, wherein one or more of the table entries map hash values to a given server of the server group used to perform data retrieval, while other table entries map hash values to other servers of the server group used for data caching.

34. A data center, comprising:
a plurality of blade server racks, each blade server rack including a plurality of servers and a switch device having a plurality of ports, the switch device being physically connected to a first one of the servers of that blade server rack through one of the ports and to a second one of the servers of that blade server rack through another of the ports, each switch device further comprising:
a packet forwarding table for use in providing traffic management across servers in a server group, the packet forwarding table having a plurality of table entries, each table entry mapping a hash value to a server in the server group; and
a frame forwarder configured to switch packets between ports of that switch device; and
a frame processor with logic configured to redirect incoming traffic to the packet forwarding table before computing a hash value, to compute the hash value from data in one or more of the fields of a packet header of a received packet, the fields of the packet header include source and destination MAC (Media Access Control) address fields, source and destination IP (Internet Protocol) address fields, and source and destination service port fields, the frame processor further comprising logic configured to use the computed hash value as an index into the packet forwarding table to access a table entry therein and identify from the table entry the server in the server group to which the table entry maps the computed hash value, wherein logic of the frame forwarder is configured to forward the packet to the identified port.

\* \* \* \* \*